United States Patent [19]
Hine et al.

[11] 3,953,138
[45] Apr. 27, 1976

[54] ONE-WAY TWIST LOCK FOR TELESCOPIC TUBES

[75] Inventors: Harrison William Hine, Pacific Palisades; Veli A. Saarinen, Carson, both of Calif.

[73] Assignee: Seaway Supply Company, Los Angeles, Calif.

[22] Filed: Jan. 6, 1975

[21] Appl. No.: 538,545

[52] U.S. Cl. .................................. 403/75; 403/104; 403/351
[51] Int. Cl.² ......................................... E04G 25/08
[58] Field of Search ........... 403/351, 352, 350, 295, 403/297, 292, 104, 75; 248/411, 412, 414, 188.5

[56] References Cited
UNITED STATES PATENTS

| | | | |
|---|---|---|---|
| 2,473,351 | 6/1949 | Thompson et al. | 248/188.5 |
| 2,517,700 | 8/1950 | Odin | 403/351 |
| 3,596,946 | 8/1971 | Burton et al. | 403/109 |
| 3,667,788 | 6/1972 | Greenwood | 403/104 |

FOREIGN PATENTS OR APPLICATIONS 728,354  2/1966  Canada ............................. 403/295

*Primary Examiner*—Andrew V. Kundrat
*Attorney, Agent, or Firm*—John E. Kelly

[57] ABSTRACT

A locking mechanism operates to selectively lock and unlock a pair of telescopic tubes. A lock base is fixed to one tube and is formed with an eccentric pin. A lock ring is slidably disposed within the other tube and is slipped over and carried by the eccentric pin. The external configuration of the lock pin and cross section of its associated tube are polygonal or multi-sided to prevent relative rotation. By relatively rotating the tubes in only one direction locking is accomplished and by relatively rotating the tubes in just the opposite direction unlocking is effected. The overall end-to-end length of the tubes can be adjusted by unlocking them, sliding one axially relative to the other and then locking them again.

10 Claims, 7 Drawing Figures

ONE-WAY TWIST LOCK FOR TELESCOPIC TUBES

BACKGROUND OF THE INVENTION

This invention generally relates to mechanical connections for general purposes and more specifically to locks and joints for telescopically coupled tubes.

It is often desirable to lock telescopic tubes together and be able to vary their overall end-to-end length. Many conventional mechanical fasteners can accomplish this.

One particular type of fastener can lock telescopic tubes together with wedging or camming force as the tubes are twisted relative to one another in either direction. Telescopic joints or connections of this type are disclosed in U.S. Pat. 2,473,351 to Thompson et al. (1949) and U.S. Pat. No. 2,517,700 to Odin (1950).

A basic component incorporated in these fasteners is an eccentric pin fixed to one tube with its axis off-set from the axis of the same tube. Rotation forces the eccentric pin to engage and wedge against a lock ring in order to accomplish locking. Rotation in the opposite direction accomplishes unlocking so the overall tube length can be selectively adjusted.

A problem with this particular type of fastener is that when conventional telescopic tubes are employed, the lock ring tends to slip and spin around under the lateral thrust exerted by the eccentric pin.

Another problem is caused by the fact that the locking action can be accomplished by twisting the tubes either clockwise or counter-clockwise. Therefore, when the same or a different person attempts to unlock the telescopic joint and mistakenly twists the tubes in the wrong direction, i.e., the locking direction, severe jamming occurs. Excessive torque exerted in the wrong direction can eventually rupture the components of the joint, the tubes or a handle if provided.

This invention is primarily aimed at overcoming these problems associated with conventional locks or joints for telescopic tubes.

SUMMARY OF THE INVENTION

Briefly stated this invention comprehends a special locking mechanism for telescopic tubes whereby locking can only be accomplished by twisting in one direction and unlocking occurs by twisting the tubes in the opposite direction.

In its broader aspects the locking mechanism incorporates a first tube having a multi-sided or polygonal cross section and a second tube that is telescopically disposed within the first tube.

A lock ring formed with a bore is slidably disposed within the first tube. The lock ring has a multi-sided or polygonal external periphery sized to prevent rotation between the lock ring and the first tube.

A lock base is fixed to one end of the second tube and is formed with an eccentric pin that is rotatably disposed within the bore of the lock ring. The eccentric pin and lock ring are structured to accomplish wedging and locking when the tubes are relatively rotated in one direction.

Turn limiting means is provided for preventing the eccentric pin and lock ring from locking when the tubes are relatively rotated in the opposite direction.

The turn limiting means also functions to prevent the eccentric pin and lock ring from exceeding a predetermined locking force. Preferably the turn limiting means incorporates a peg projecting laterally outwardly from the eccentric pin. A pair of stop shoulders is formed by the lock ring and positioned on opposite sides of the peg in order to limit angular displacement by the peg. Engagement of one stop shoulder by the peg serves to prevent locking between the eccentric pin and lock ring while engagement of the other stop shoulder by the peg serves to prevent the eccentric pin and lock ring from becoming severely jammed together.

The lock ring is preferably constructed from resilient material and has a slot along one side by which it can be laterally slipped over and removed from the eccentric pin. The external periphery of the lock ring and the cross section of the first tube are generally rectangular.

The lock base includes a pair of longitudinally spaced flanges of larger size than the eccentric pin which restrict axial movement by the lock ring. A plug portion of the lock base is inserted within and fixed to the second tube.

An inwardly directed catch is formed by one end of the first tube. One of the flanges of the lock base is sufficiently large to engage the catch and thereby prevent the tubes from separating when they are being fully extended.

The lock mechanism of this invention may fulfill various needs and be used for general purposes and one particular use is in connection with an adjustable tiller extension. In this particular embodiment a universal joint is attached to the outer end of the first tube for connection to a tiller. A handle is attached to the outer end of the second tube for use by a person in unlocking and locking the eccentric pin and lock ring in order to adjust the overall end-to-end length of the tubes.

Optionally, indicating means is provided for indicating the direction in which to twist the second tube to effect locking and indicate the opposite direction in which to twist the second tube to effect unlocking.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENTS

The one-way twist lock for a pair of telescopic tubes may be incorporated in various types of mechanisms to serve different functions. It may be used for example in height adjustment supports such as camera tripods, in recreational equipment such as tent poles or stakes, sports equipment such as ski poles and nautical equipment such as whisker poles or tiller extensions.

Figure 1:
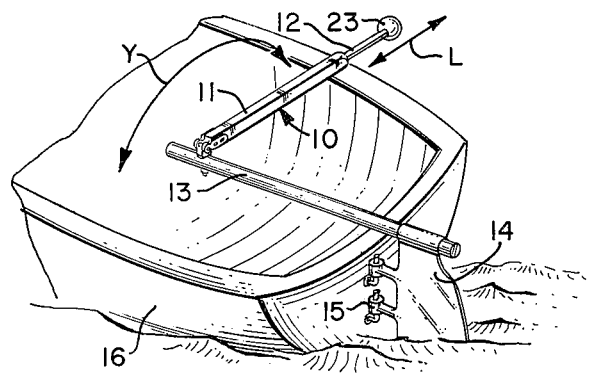
FIG. 1 is a perspective fragmentary view showing the one way twist lock of this invention incorporated by an adjustable tiller extension for boats.

For purposes of illustration a locking mechanism will be described in connection with an adjustable tiller extension or hiking stick as shown in FIG. 1. The tiller extension 10 has an inner or relatively inboard elongated tube 11 and an outer or relatively outboard elongated tube 12. The tubes 11 and 12, as shall be more fully explained, can be mutually longitudinally adjusted in order to vary the end-to-end length of the tiller extension 10. Tube 11 is swively coupled to the forward end of a conventional tiller 13 that can be manipulated to operate a conventional rudder 14. Rudder 14 is coupled through a hinge assembly 15 to a sailboat 16.

Figure 2:
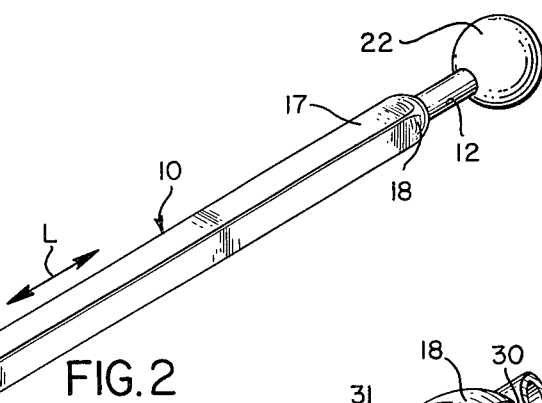
FIG. 2 is a perspective view of a one-way twist lock.

Referring primarily to FIG. 2, tube 11 has an inner end 16 and an outer end 17. Tube 11 has a polygonal or multisided cross sectional configuration except that the tip 18 of end 17 is smoothly contoured to define a circular cross section. End 16 of tube 11 is secured to a universal joint 19 that includes a vertically aligned bolt 20 shaped to extend through the tiller 13 shown in FIG. 1. Bolt 20 is coupled to a hinge 21. When a sailor grasps a handle 22 that may be a cork ball, for example, he can selectively swing the tiller extension 10 in a horizontal plane as indicated by directional arrow X or in a vertical plane as indicated by directional arrow Y. The universal joint 19 permits the tiller extension 10 to be rotated conveniently in all directions through any desired arcuate paths. The locking mechanism incorporated within tiller extension 10 may be used while varying the overall end-to-end length of tubes 11 and 12 as indicated by directional arrow L.

Figure 3:
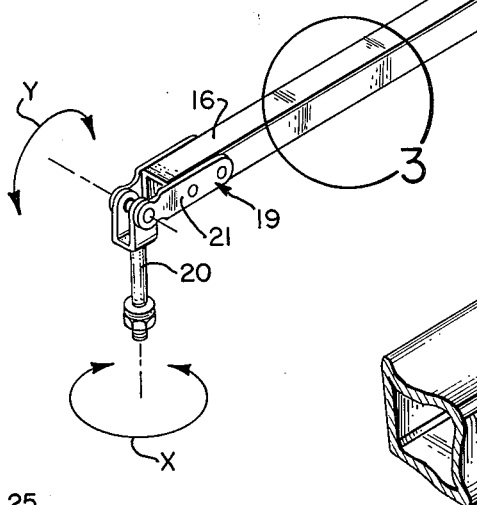
FIG. 3 is a perspective, fragmentary, and sectional view of the locking mechanism fully assembled and operationally positioned within a tube of multi-sided cross section.

Referring now primarily to FIG. 3 a twist lock mechanism 23 is shown positioned within tube 11 which, in this embodiment, has a generally rectangular cross section. Lock mechanism 23 includes a lock base 24 and a lock ring 25. The lock base 24 is provided with a pair of axially or longitudinally spaced flanges 26 and 27, an eccentric pin 28 and a peg 29 extending laterally from pin 28.

The edge of tip 18 is bent inwardly and backwardly to form a bead or catch 30. Flange 26 of lock base 24 is enlarged or sufficiently sized to engage catch 30 and thereby prevent the tubes 11 and 12 from separating when they are being mutually slid or telescoped to their fully extended limits.

Relative rotation by the tubes 11 and 12 in one direction serves to accomplish locking action while relative rotation by the tubes 11 and 12 in the opposite or reverse direction serves to accomplish unlocking. To assist the sailor or other person in manipulating the tiller extension 10 or any other device incorporating lock mechanism 23 — an indicating means 31 is provided. The indicating means 31 is shown in the form of a stick-on label bearing indicia characterized by one directional arrow referring to "Lock" and another directional arrow pointed in the opposite direction associated with the word "Unlock".

Figure 4:
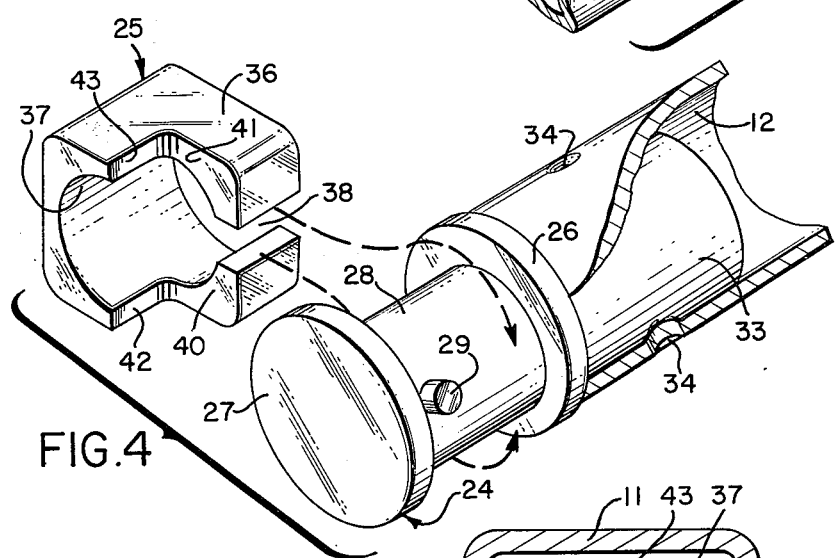
FIG. 4 is a perspective, sectional and exploded view showing the lock ring component positioned to one side of the lock base.

Referring now primarily to FIG. 4 the axis of eccentric pin 28 is laterally off-set from the axis of tube 12 which has a circular cross section. The lock base 24 is formed with a cylindrical plug 33 inserted into one end of tube 12 and firmly fixed thereto by dimples 34 or any other suitable fasteners such as rivets. The peg projects from a side wall portion of the eccentric pin 28 which is the farthest distance from the axis of tube 12. This particular side wall portion serves as a lobe or cam for making wedging engagement in a manner that shall be described.

The lock ring 25 has an external periphery 36 shaped analogous to the cross section of tube 11. Each is polygonal or multi-sided and relatively sized so that the lock ring 25 is prevented from rotating or spinning relative to tube 11. When the lock mechanism 23 is fully assembled, the eccentric pin 28 is rotatably disposed within the bore 37 of lock ring 25. Notches 40 and 41 are formed in the lock ring 25 giving it a general L-shape and defining a pair of stop shoulders 42 and 43 respectively.

The stop shoulders 42 and 43 define a turn limiting means that limits angular displacement by eccentric pin 28. Engagement of stop shoulder 42 by peg 29 prevents locking between the eccentric pin 28 and the lock ring 25. Engagement of the other stop shoulder 43 by the peg 29 prevents the eccentric pin 28 and lock ring 25 from exceeding a predetermined locking force and becoming severely jammed.

The lock ring 25 is preferably constructed from resilient durable plastic material and a side wall is formed with a slot 38 by which it can be laterally slipped over and removed from the eccentric pin 28.

Figure 5:
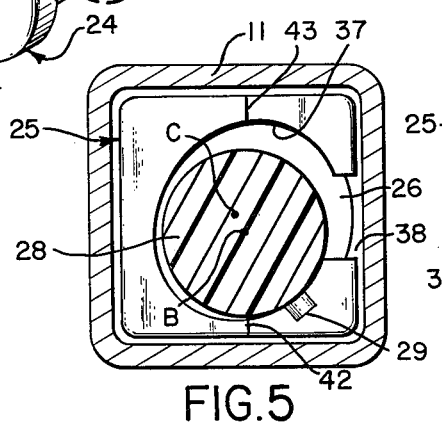
FIG. 5 is a lateral cross-sectional view showing the eccentric pin and lock base in an unlocked position.
Figure 6:
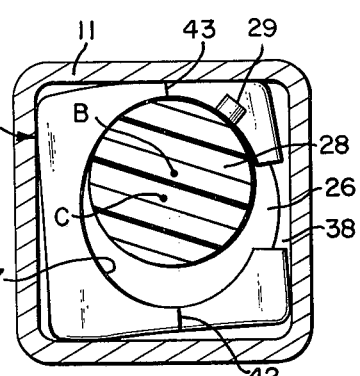
FIG. 6 is a lateral cross-sectional view showing the eccentric pin and lock base in a locked position; and, FIG. 7 is a lateral cross sectional view of another embodiment of this invention showing the lock ring and associated tube shaped with six side walls.

Referring now to FIG. 5 eccentric pin 28 is shown in an unlocked position near stop shoulder 42. In this position tube 12 along with the entire lock mechanism 23 can be axially slid within tube 11. In FIG. 6 the eccentric pin 28 has been moved to a locking position near but not in contact with stop shoulder 43. In this position eccentric pin 28 is wedged or cammed against lock ring 25 which becomes distorted within tube 11. Corners of lock ring 25 engage and press against corresponding corners of tube 11 and all relative rotation or spin is prevented. Severe jamming that might otherwise be caused by excessive torque is prevented by engagement between stop shoulder 43 and peg 29. The letter B represents the axis of eccentric pin 28 and letter C represents the axis of tube 11. During its angular displacement the axis B of eccentric pin 28 partially orbits the axis C of tube 11.

Figure 7:
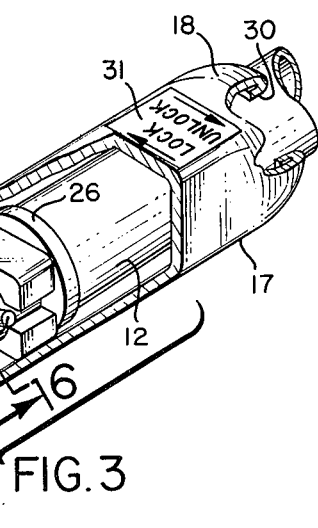

FIG. 7 illustrates another embodiment of a multi-sided tube 50 and a corresponding lock ring 51 having an external periphery of the same or analogous configuration. Lock ring 51 has a bore 52, stop shoulders 53 and 54 and a side slot 55. The particular external configuration of the lock ring and cross sectional configuration of the corresponding tube may be of any polygonal or multi-sided shape such as triangular, rectangular or hexagonal.

OPERATION

Keeping the above construction in mind, it can be understood how problems associated with conventional joints and locks for telescopic tubes are overcome or substantially eliminated by this invention.

As a sailor attempts to negotiate sailboat 16 through changing wind and water conditions and perform different maneuvers, it may become necessary or at least desirable to adjust the overall end-to-end length of the tiller extension 10. The tiller extension 10 may be converted from relatively short to relatively long and vice versa by releasing the lock mechanism 23, shifting tube 12 within tube 11 and then resetting the lock mechanism 23. All of this action can be quickly and easily accomplished by manipulating handle 22.

Guided or assisted by the indicating label 31, the sailor may turn the handle 22 to the left thereby rotating tube 12 counter-clockwise and releasing or unlocking the lock mechanism 23. Tube 12 carrying the lock mechanism may thereafter be axially shifted within tube 11 until a desired adjusted length for the tiller extension 10 has been achieved. Thereafter the sailor may re-engage or lock the lock mechanism 23 by turning handle 22 to the right and rotating shaft 12 in a clockwise direction.

Whenever the person or sailor rotates shaft 12 counter-clockwise locking engagement is prevented due to engagement of stop shoulder 42 by the peg 29. Under these circumstances the eccentric pin 28 and the locking ring 25 are prevented from experiencing camming or wedging action and are arranged in a loose fit.

The eccentric pin 28 and lock ring 25 are prevented from becoming severely jammed together since peg 29 will engage stop shoulder 43 when a predetermined measure of wedging force has been achieved.

While urging eccentric ring 28 to its locking position the lock ring 25 is prevented from spinning because its corners generally engage and become stopped by the corresponding corners of tube 11.

From the foregoing, it will be evident that the present invention has provided a one-way twist lock mechanism for telescopic tubes in which all of the various advantages are fully realized.

What is claimed is:

1. A twist lock mechanism for telescopic tubes, comprising:
    a. a first tube having a multi-sided cross section;
    b. a second tube telescopically disposed within the first tube;
    c. a split lock ring formed with a bore and slidably disposed within the first tube, the lock ring having a multisided external periphery sized to prevent rotation between the lock ring and first tube and a notch in one end intersecting both sides of said split;
    d. a lock base fixed to one end of the second tube;
    e. an eccentric pin extending from the lock base and disposed within the bore of the lock ring, the eccentric pin and lock ring being structured to wedge and accomplish locking when the tubes are relatively rotated in one direction; and,
    f. turn limiting means for preventing the eccentric pin and lock ring from locking when the tubes are relatively rotated in the opposite direction.

2. The structure according to claim 1 wherein the turn limiting means includes:
    a peg projecting laterally outwardly from the eccentric pin; and,
    a stop shoulder formed on the lock ring by said notch and positioned for engagement by the peg when the tubes are relatively rotated in said opposite direction.

3. The structure according to claim 1 wherein the turn limiting means includes:
    a stop element for preventing the eccentric pin and lock ring from exceeding a predetermined locking force.

4. The structure according to claim 1 wherein the turn limiting means includes:
    a peg projecting laterally outwardly from the eccentric pin; and,
    a pair of stop shoulders formed by the lock ring notch and positioned on opposite sides of the peg to limit angular displacement by the peg, wherein engagement of one stop shoulder by the peg prevents locking between the eccentric pin and lock ring, and, engagement of the other stop shoulder by the peg prevents the eccentric pin and lock ring from exceeding a predetermined locking force and becoming jammed.

5. The structure according to claim 1 wherein the lock ring is constructed from resilient material and has said split along one side by which the lock ring can be laterally slipped over and removed from the eccentric pin.

6. The structure according to claim 5, wherein:
    the cross section of the first tube and external periphery of the lock ring are generally rectangular.

7. The structure according to claim 1 wherein the lock base includes;
    a plug inserted within and fixed to the second tube; and,
    a pair of longitudinally spaced flanges of larger size than the eccentric pin which restrict axial movement by the lock ring.

8. The structure according to claim 7 wherein:
    an inwardly directed catch is formed by said one end of the first tube; and,
    one of the flanges is sufficiently large to engage the catch and prevent the tubes from separating when they are being fully extended.

9. A one-way twist lock mechanism for telescopic tubes, comprising:
    a. a first tube having a rectangular cross section;
    b. a second tube telescopically disposed within the first tube;
    c. a resilient split lock ring formed with a bore and slidably disposed within the first tube, the lock ring having a rectangular external periphery sized to prevent rotation between the lock ring and first tube;
    d. a lock base fixed to one end of the second tube;
    e. an eccentric pin extending from the lock base and disposed within the bore of the lock ring, the eccentric pin and lock ring being structured to wedge and accomplish locking when the tubes are relatively rotated in one direction;
    f. said split defining means along one side of the lock ring by which it can be laterally slipped over and removed from the eccentric pin; and,
    g. turn limiting means including a peg projecting laterally outwardly from the eccentric pin, and a notch in one end of said ring intersecting both sides of said split to define
    a pair of stop shoulders formed by the lock ring and positioned on opposite sides of the peg to limit angular displacement by the peg
    wherein engagement of one stop shoulder by the peg prevents locking between the eccentric pin and lock ring, and, engagement of the other stop shoulder by the peg prevents the eccentric pin and lock ring from exceeding a predetermined locking force and becoming jammed.

10. The structure according to claim 9 including:
    indicating means for indicating the direction in which to twist the second tube to effect locking and the opposite direction in which to twist the second tube to effect unlocking.

* * * * *